United States Patent
Zhidkov (10) Patent No.: US 7,430,256 B2
(45) Date of Patent: Sep. 30, 2008

(54) METHOD AND APPARATUS FOR PROVIDING CHANNEL STATE INFORMATION

(75) Inventor: Sergey Zhidkov, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 856 days.

(21) Appl. No.: 10/801,529

(22) Filed: Mar. 17, 2004

(65) Prior Publication Data

US 2005/0069054 A1 Mar. 31, 2005

(30) Foreign Application Priority Data

Sep. 26, 2003 (KR) .................. 10-2003-0066945

(51) Int. Cl.
*H04L 25/08* (2006.01)
(52) U.S. Cl. ...................... 375/346; 375/316
(58) Field of Classification Search ............... 375/346, 375/316, 340
See application file for complete search history.

(56) References Cited

U.S. PATENT DOCUMENTS

| 5,636,253 | A | 6/1997 | Spruyt | |
|---|---|---|---|---|
| 6,633,325 | B1 * | 10/2003 | Lee | 348/21 |
| 7,106,810 | B2 * | 9/2006 | Collins et al. | 375/316 |
| 7,221,720 | B2 * | 5/2007 | Robinson | 375/341 |
| 7,366,088 | B2 * | 4/2008 | Bolinth et al. | 370/203 |
| 2004/0218519 | A1 * | 11/2004 | Chiou et al. | 370/203 |

FOREIGN PATENT DOCUMENTS

| EP | 0 991 239 | A2 | 4/2000 |
|---|---|---|---|
| EP | 1 221 793 | A2 | 7/2002 |
| EP | 1322058 | A1 | 6/2003 |
| EP | 1221793 | A2 | 9/2003 |
| WO | WO 2004/045132 | A1 | 5/2004 |

OTHER PUBLICATIONS

Wang et al (A Soft Decision Decoding Scheme for Wireless COFDM with Application to DVB-T, IEEE Transactions on Consumer Electronics, vol. 50, No. 1, Feb. 2004).*
Foreign Search Report issued Feb. 14, 2005.
GB Search and Examination Report dated Nov. 20, 2006.

* cited by examiner

*Primary Examiner*—Chieh M. Fan
*Assistant Examiner*—Aristocratis Fotakis
(74) *Attorney, Agent, or Firm*—Harness, Dickey & Pierce, P.L.C.

(57) ABSTRACT

A method an apparatus for providing channel state information in a receiver are described. In the method, direct channel state information may be generated based on a calculated error signal, and indirect channel state information may be generated based on a magnitude of a channel frequency response. A channel state selection control signal is generated based on the calculated error signal and magnitude of the channel frequency response. One of the direct channel state information and indirect channel state information may be output based on a logic state of the channel state selection control signal.

22 Claims, 11 Drawing Sheets

METHOD AND APPARATUS FOR PROVIDING CHANNEL STATE INFORMATION

CROSS-REFERENCE TO RELATED APPLICATION

This application claims the priority of Korean Patent Application No. 2003-66945, filed on Sep. 26, 2003, in the Korean Intellectual Property Office, the disclosure of which is incorporated herein in its entirety by reference.

BACKGROUND OF THE INVENTION

1. Field of the Invention

The present invention relates generally to a method and apparatus for providing channel state information.

2. Description of the Related Art

Figure 1:
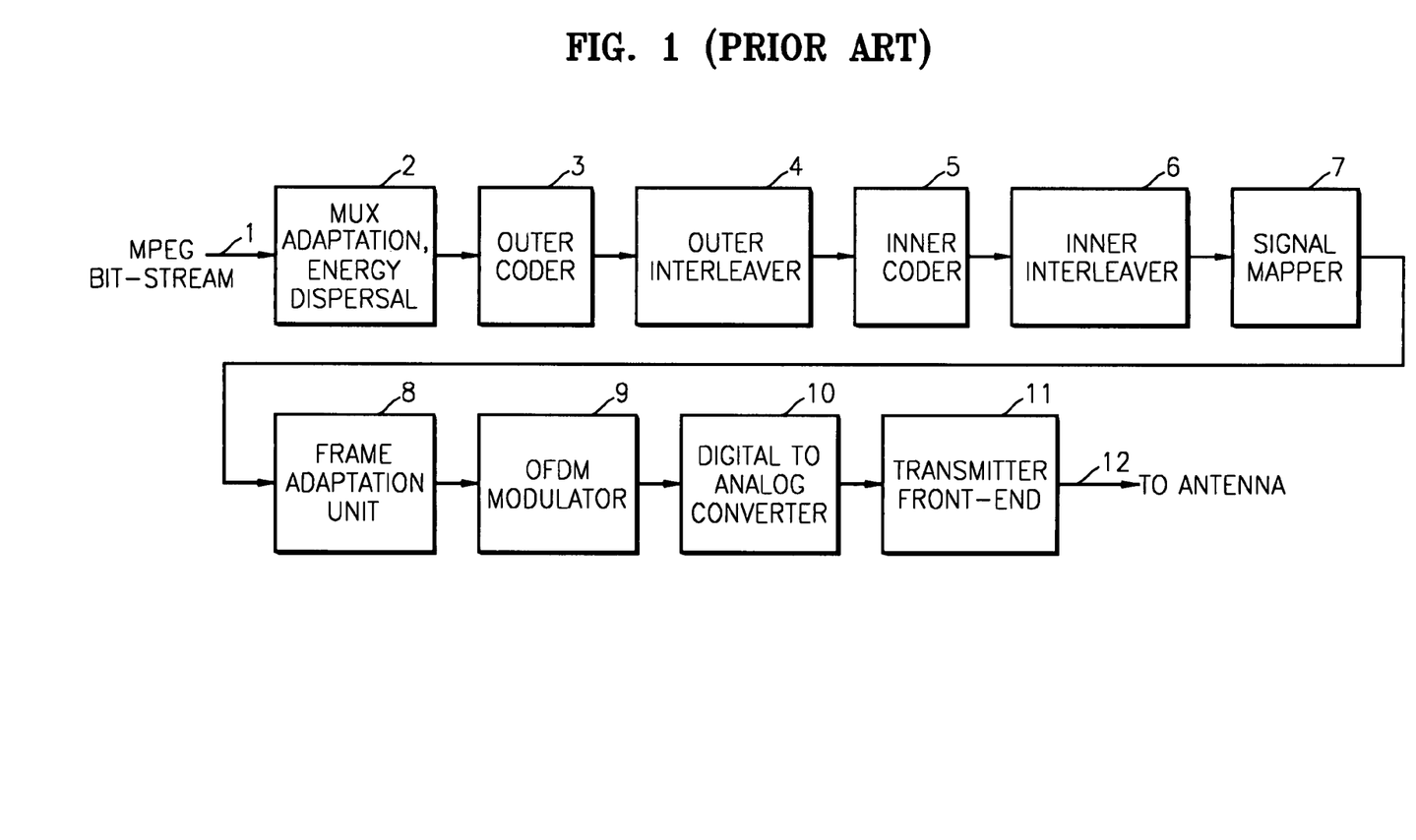
FIG. 1 is a block diagram of a prior art DVB-T transmitter.

FIG. 1 is a block diagram of a prior art digital video broadcasting terrestrial (DVB-T) transmitter. The DVB-T transmitter of FIG. 1 processes a Moving Picture Experts Group (MPEG) bit stream 1 of a DVB-T signal and transmits a resulting signal into the air via an antenna. The DVB-T transmitter includes an energy dispersal unit 2, an outer coder 3, an outer interleaver 4, an inner coder 5, an inner interleaver 6, a signal mapper 7, a frame adaptation unit 8, an OFDM modulator 9, a digital-to-analog converter (DAC) 10 and a transmitter front-end 11. The signal mapper 7 generates in-phase (I) and quadrature (Q) signals according to a modulation format such as quadrature phase shift keying (QPSK), 16-quadrature amplitude modulation (QAM), 64-QAM, etc. The frame adaptation unit 8 changes these signals to a frame structure. Each frame consists of 68 OFDM symbols. Each OFDM symbol consists of 6817 active carriers (in 8 k mode) or 1705 active carriers (in 2 k mode). This frame structure is a standard of European Telecommunication Standard Institute (ETSI).

Figure 2:
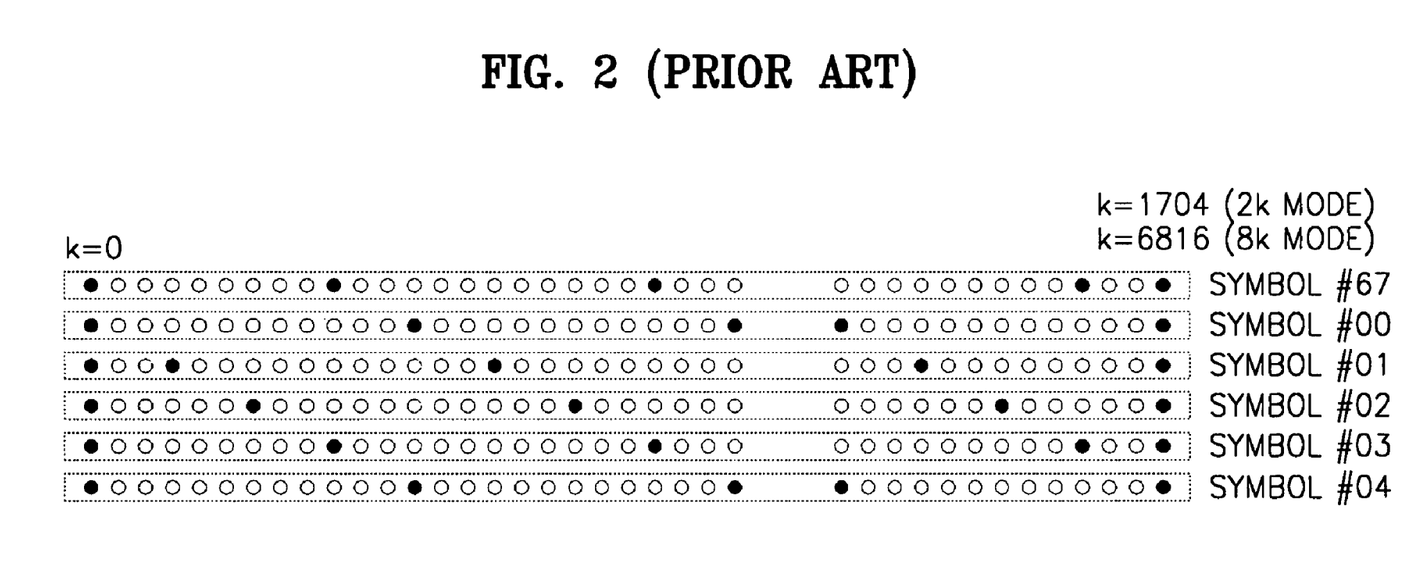
FIG. 2 illustrates a scattered pilot insertion pattern in a prior art DVB-T system.

FIG. 2 illustrates a scattered pilot insertion pattern in a prior art DVB-T system. In addition to changing the modulated signals to a frame structure, the frame adaptation unit 8 inserts a Continual Pilot Carrier (CPC), a Scattered Pilot Carrier (SPC) and Transmission Parameter Signaling Carriers (TPSCs) into the frame structure. Positions of these carriers are predetermined, and, as shown in FIG. 2, a scattered pilot insertion pattern has a form in which every fourth symbol is the same (see SYMBOL #00 and SYMBOL #04, for example).

Figure 3:
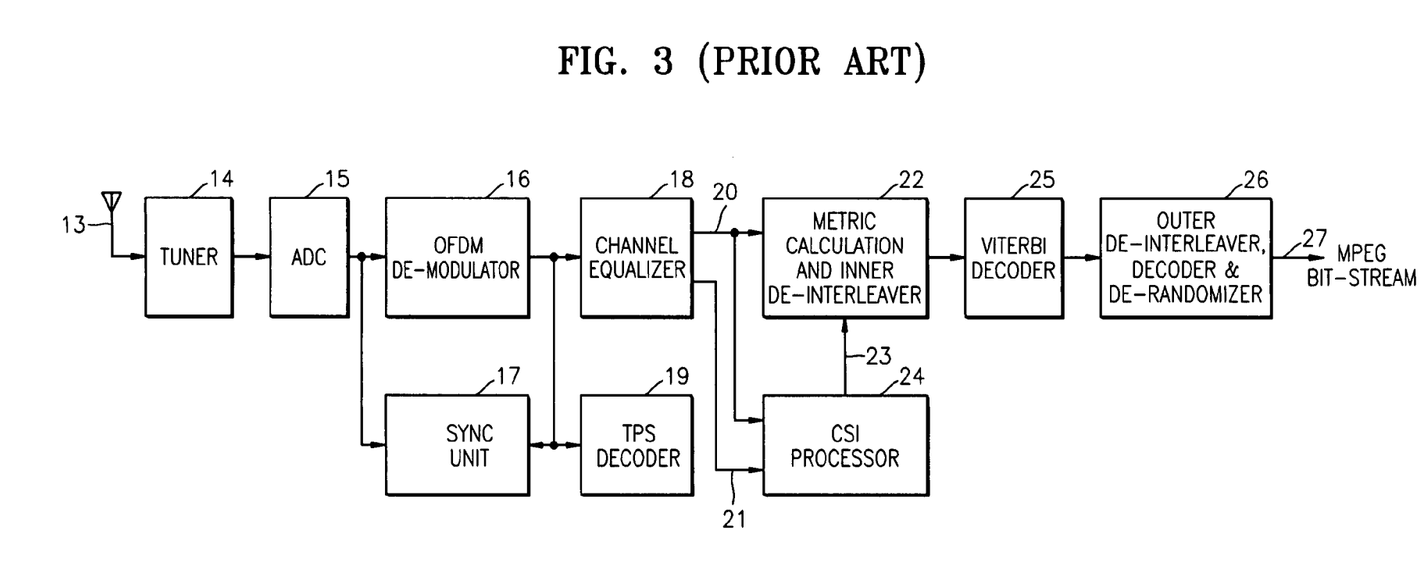
FIG. 3 is a block diagram of a prior DVB-T receiver.

FIG. 3 is a block diagram of a prior art DVB-T receiver. The DVB-T receiver of FIG. 3 processes an aerial wave received via an antenna 13 by a procedure inverse to that of the transmitter shown in FIG. 1, and transmits a generated MPEG bit stream 27 to a downstream MPEG bit stream processor. The DVB-T receiver includes a tuner 14, an ADC 15, an OFDM demodulator 16, a synchronization unit 17, a channel equalizer 18, a television par satellite (TPS) decoder 19, a bit metric calculator and inner de-interleaver 22, a channel state information (CSI) processor 24, a Viterbi decoder 25 and an outer de-interleaver, decoder and de-randomizer 26.

The channel equalizer 18 outputs an equalized complex OFDM signal and a squared magnitude of a channel frequency response (hereinafter, referred to as an "SMCFR"). The CSI processor 24 estimates the degree of certainty for each of the carriers of an OFDM signal and outputs a CSI value. The CSI value is generally a signal-to-noise ratio of a sub-carrier.

Figure 4:
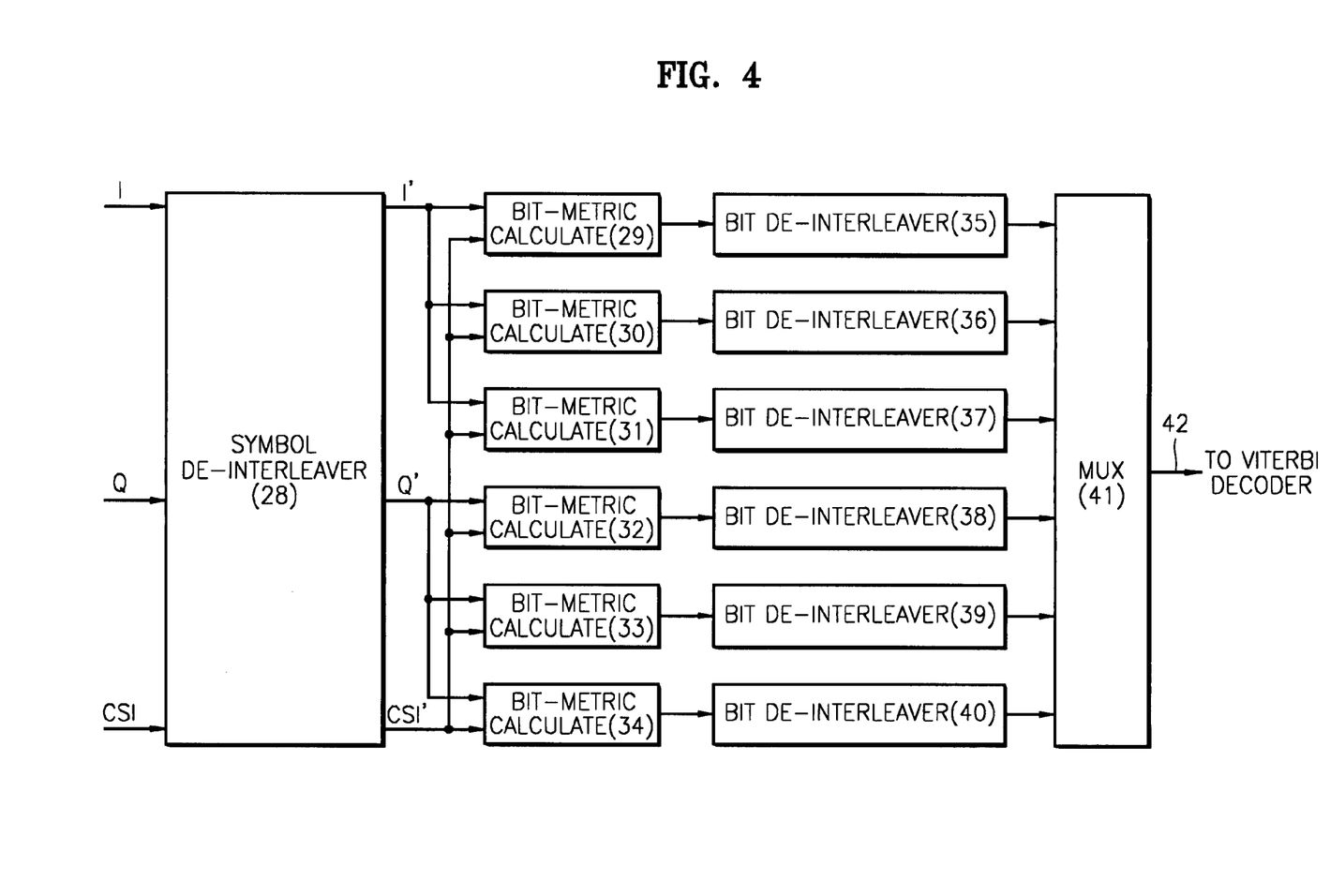
FIG. 4 is a block diagram of a bit metric calculator and inner de-interleaving unit of FIG. 3.

FIG. 4 is a block diagram of the bit metric calculator and inner de-interleaver 22 of FIG. 3. Here, the 64-QAM transmission mode is used. The bit metric calculator and inner de-interleaver 22 outputs symbols obtained by processing the CSI value and the I and Q signals received from the channel equalizer 18 to the Viterbi decoder 25. The bit metric calculator and inner de-interleaver 22 includes a symbol de-interleaver 28, bit metric calculators 29-34, bit de-interleavers 35-40 and a bit multiplexer 41.

Figure 5:
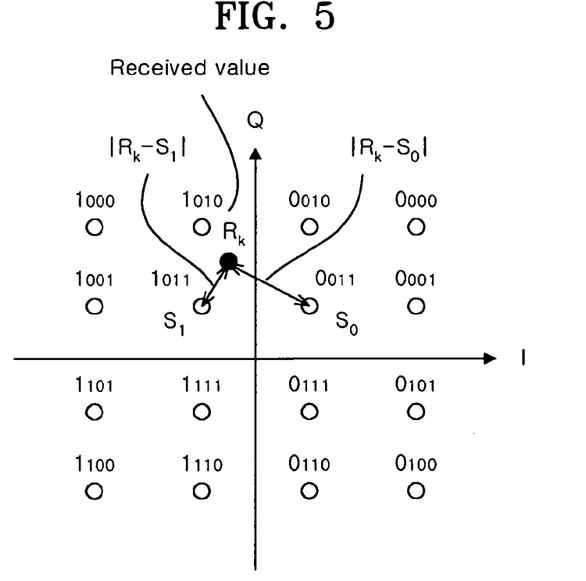
FIG. 5 is a view for explaining bit metric calculation.

FIG. 5 is a view for explaining bit metric calculation. A bit metric is calculated through de-mapping shown in FIG. 5, based on the following expression (1):

$$BM_i = CSI_k \times (|R_k - S_0|^2 - |R_k - S_1|^2) \tag{1}$$

In Expression (1), $BM_i$ is an $i^{th}$ bit metric, $R_k$ is a complex value of a $k^{th}$ carrier, and $S_0$ is a value corresponding to '0' at an $i^{th}$ position, as a complex value of a nearest point on an I-Q constellation plot (constellation plot of In-phase and Quadrature components). $S_1$ is a value corresponding to '1' at the $i^{th}$ position, as a complex value of a nearest point on the I-Q constellation plot, and $CSI_k$ is a CSI signal of the $k^{th}$ carrier. FIG. 5 shows an example of a 16-QAM transmission mode.

Figure 6:
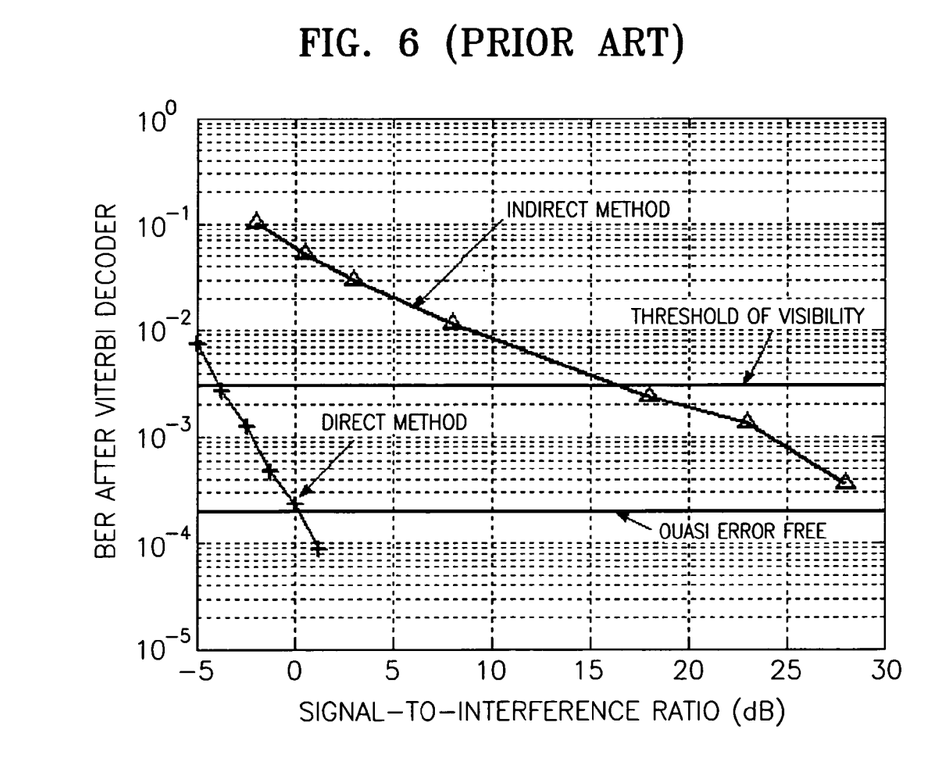
FIG. 6 is a graph of bit error rate in a channel with co-channel interference versus SIR.
Figure 7:
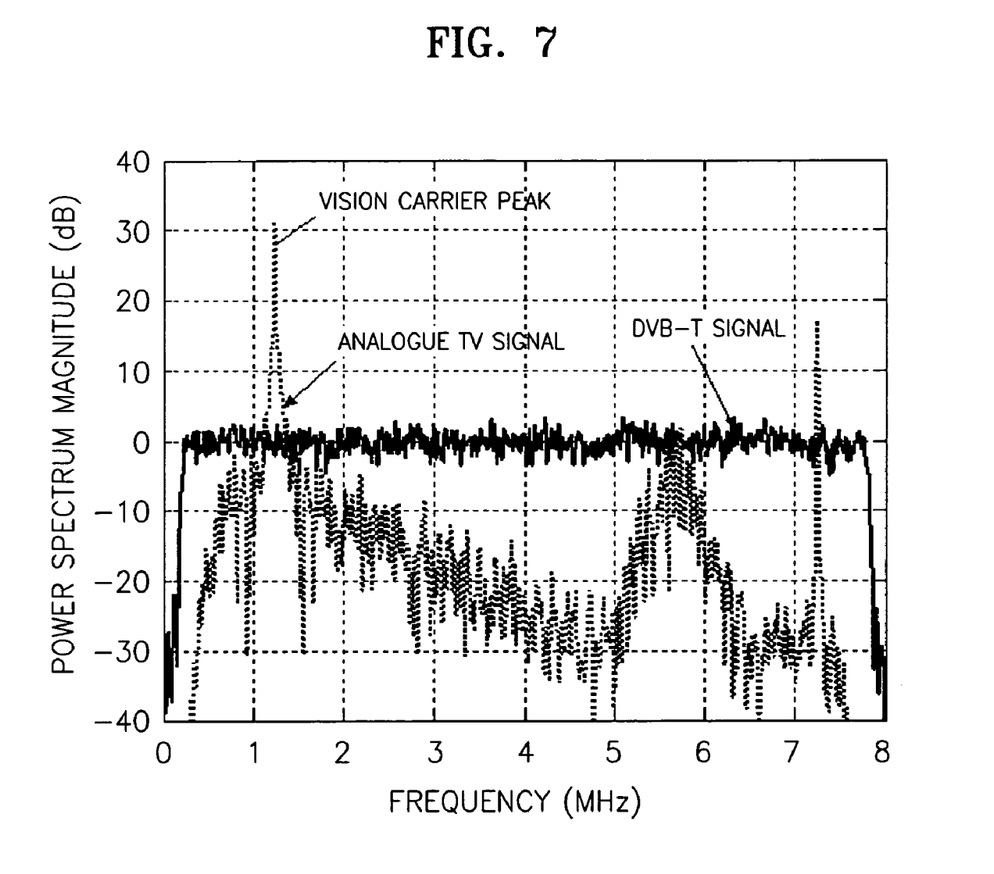
FIG. 7 illustrates spectrums for frequency responses of a DVB-T signal and an analog broadcasting signal.

FIG. 6 is a graph of bit error rate in a channel with co-channel interference versus SIR; and FIG. 7 illustrates spectrums for frequency responses of a DVB-T signal and an analog broadcasting signal. CSI measurement methods include an indirect measurement method, a direct measurement method and a combined direct-indirect method. The DVB-T receiver of FIG. 3 adopts an indirect method for channel state measurement using the SMCFR calculated in channel equalizer 18.

Referring to FIG. 6, the indirect measurement method exhibits good performance in a channel with white noise or in a static channel. The indirect method does not exhibit good performance in a channel with frequency selective interference. For example, co-channel interference in a co-channel may be a case where an analog TV signal is mixed into the DVB-T signal and which has a spectrum as shown in FIG. 7. In such a case, the indirect method of channel state information measurement exhibits poor performance due to the presence of co-channel interference. This is because the indirect method cannot provide sufficiently accurate channel state information to achieve a desired SNR with a desired low bit error rate (BER) after Viterbi decoding, in the presence of the co-channel interference.

Figure 8:
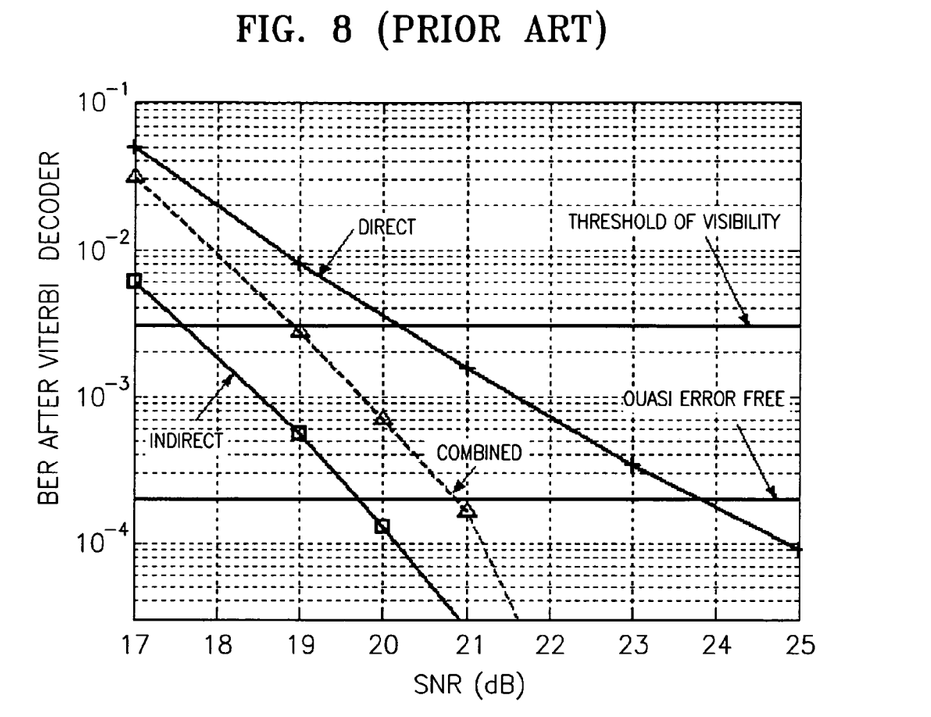
FIG. 8 is a graph of bit error rate in a multi-path channel versus SNR.

FIG. 8 is a graph of bit error rate in a multi-path channel versus SNR. FIG. 8 illustrates the problem with direct measurement method performance in a channel with white noise, such as a multi-path channel. Referring to FIG. 8, the indirect method of channel state measurement obtains an SNR gain of about 3.3 dB at a bit error rate of $2*10^{-4}$, as compared to a direct method of channel state measurement.

In order to have good performance in a channel with frequency selective interference (co-channel interference), there have been attempts at the direct method of channel state measurement and a combined direct-indirect method of channel state measurement. The direct method of channel state measurement uses differences between a received signal value and the nearest points in an I-Q constellation plot, as shown in FIG. 5. A direct measurement method is disclosed in detail in U.S. Pat. No. 5,636,253 and European Patent No. EP 0991239. The direct method exhibits good performance in a channel with frequency selective interference (co-channel interference), but does not exhibit good performance in a channel with white noise or in a static channel.

A combined method of channel state measurement is suggested in European Patent No. EP 1221793. However, the method disclosed in the EP '793 patent does not appear to exhibit improved performance, for a channel with frequency selective interference, as compared to performance using the indirect method.

SUMMARY OF THE INVENTION

Exemplary embodiments of the present invention are directed to a method and apparatus for providing channel state information in a receiver. Direct channel state information may be generated based on a calculated error signal, and indirect channel state information may be generated based on a magnitude of a channel frequency response. A channel state selection control signal is generated based on the calculated error signal and magnitude of the channel frequency response. One of the direct channel state information and indirect channel state information may be output based on a logic state of the channel state selection control signal.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE EXEMPLARY EMBODIMENTS

The exemplary embodiments of the present invention will now be described more fully with reference to the accompanying drawings. Throughout the drawings, like reference numerals are used to refer to like elements.

In general, the exemplary embodiments of the present invention are directed to a channel state measurement apparatus of a receiver such as a DVB-T receiver, and to a method for providing channel state measurement information in the receiver. The apparatus and method may use sub-carriers of an OFDM (orthogonal frequency division multiplexing) signal. The OFDM signal may be a DVB-T signal as defined in ETSI EN 300 744 specification, for example, although exemplary embodiments are not limited to DVB-T signal.

The apparatus and method may be configured to select one of a direct method of channel state measurement and an indirect method of channel state measurement based on a detected amount of co-channel interference. The apparatus and method may thus provide reliable channel state information, which may be used in bit metric calculations of a subsequent or downstream error correction decoder in the receiver such as a Viterbi decoder, for example, potentially increasing SNR gain of a system employing the method or apparatus.

Figure 9:
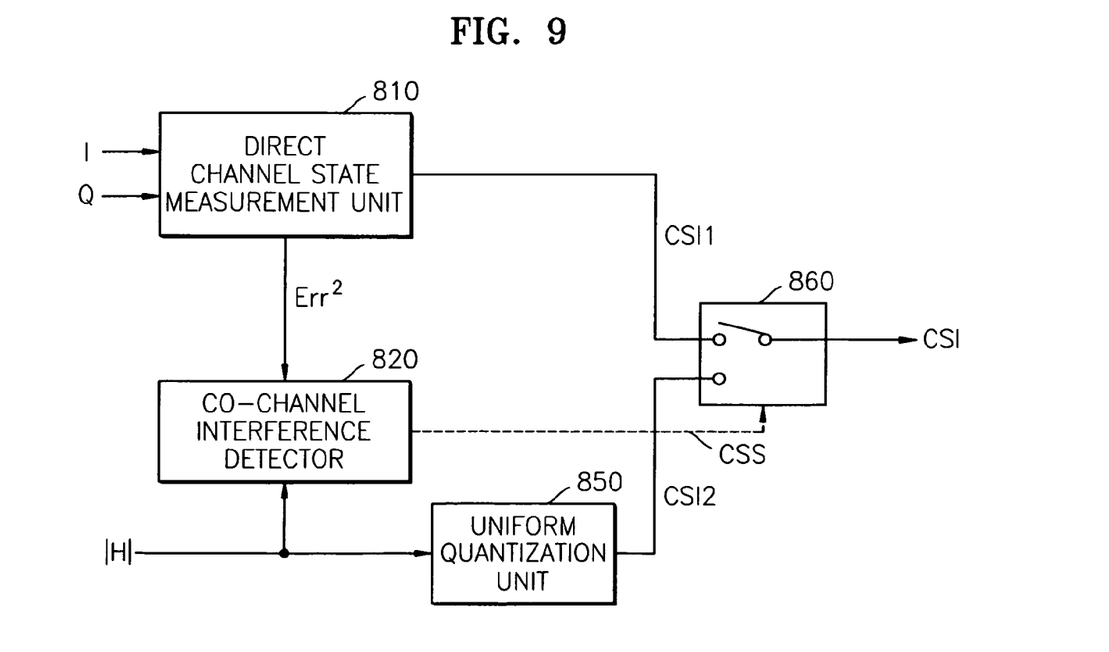
FIG. 9 is a block diagram of a channel state measurement apparatus of a DVB-T receiver, according to an exemplary embodiment of the present invention.

FIG. 9 is a block diagram of a channel state measurement apparatus of a DVB-T receiver according to an exemplary embodiment of the present invention. Referring to FIG. 9, the channel state measurement apparatus of a DVB-T receiver may include a direct channel state measurement unit 810, a uniform quantization unit 850, a co-channel interference detector 820 and a selector 860.

The direct channel state measurement unit 810 receives complex symbol streams I and Q, performs de-mapping on the received complex symbol streams I and Q and calculates an error signal $Err^2$ based on the received complex symbol streams I and Q and on the de-mapping results. The direct channel state measurement unit 810 generates the direct channel state information CSI1 for output based on the error signal $Err^2$. The complex symbol streams I and Q may be digital signals, and each stream may be composed of about 9 to 11 bits.

The uniform quantization unit 850 may be an indirect channel state measurement unit, for example, and may generate indirect channel state information CSI2 for output using a magnitude of a channel frequency response |H|. The indirect channel state information CSI2 may result from quantizing the magnitude of the channel frequency response |H| with a uniform transfer function. The magnitude |H| of the channel frequency response may be a digital signal of about 9 to 11 bits, for example. The indirect channel state information CSI2 may be a digital signal quantized into about 3 to 4 bits using the uniform transfer function. The uniform transfer function may output the quantized digital signal of about 3 to 4 bits in proportion to the magnitude of the channel frequency response |H|. For example, the uniform transfer function may be invoked to take the upper 3 to 4 bits of the magnitude of the channel frequency response |H| (which is about 9 to 11 bits) and to remove the remaining bits of the channel frequency response.

The co-channel interference detector 820 generates a channel state selection control signal CSS for output. The CSS is generated based on the error signal $Err^2$ and the magnitude of the channel frequency response |H|.

The selector 860 may selectively output one of the direct channel state information CSI1 and the indirect channel state information CSI2, based on the logic state of the channel state selection control signal CSS. The channel state information CSI1 or CSI2 may be output from the selector 860 to the bit metric calculator and inner de-interleaver 22, or to the Viterbi decoder 25 of FIG. 4, for example, so as to be used for error correction.

The co-channel interference detector 820 thus detects co-channel interference and outputs the channel state selection control signal CSS. The logic state of the channel state selection control signal CSS changes based on a given amount of co-channel interference, so that the channel state measurement apparatus may adaptively output reliable channel state information (CSI) based on the co-channel interference. Accordingly, a direct or indirect method of channel state measurement may be selectively performed according to the channel state selection control signal CSS.

Figure 10A:
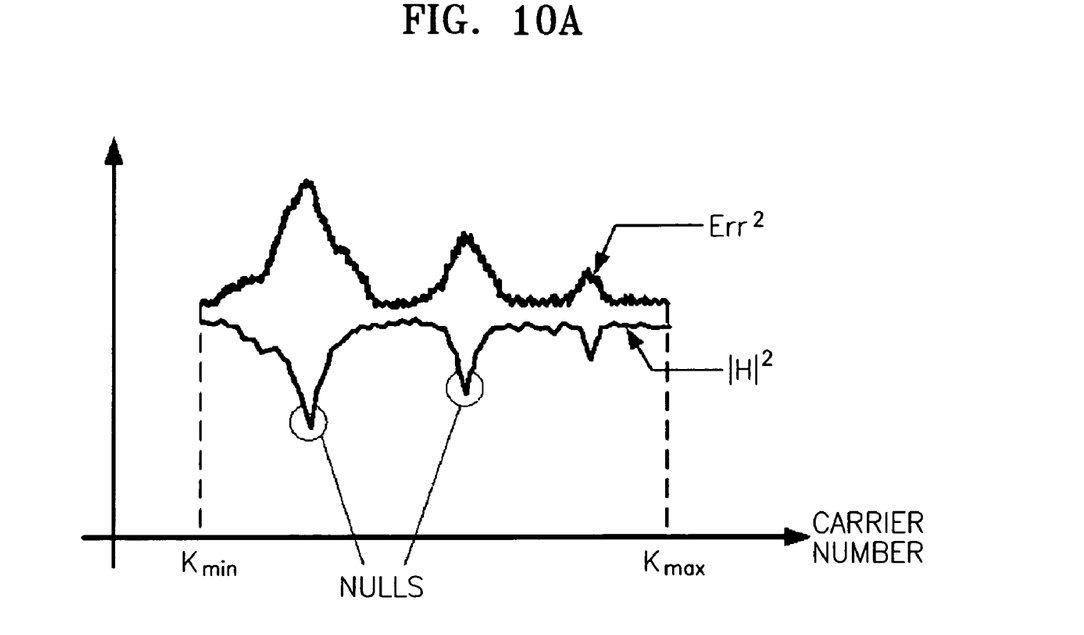
FIG. 10A is a graph illustrating a squared magnitude of a channel frequency response and a squared magnitude of an error signal when co-channel interference is not present in a channel.
Figure 10B:
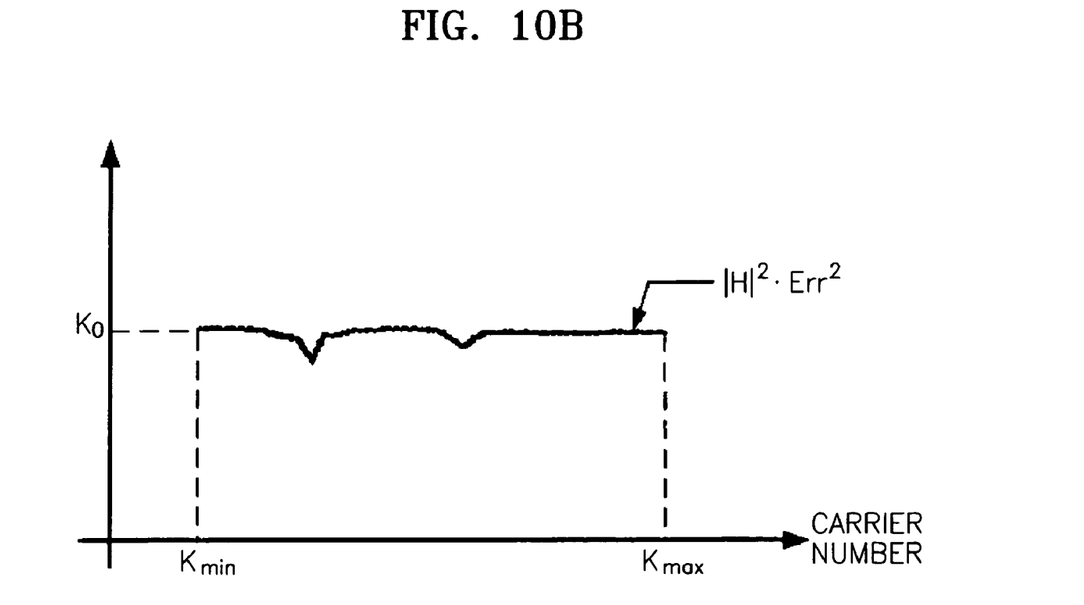
FIG. 10B is a graph illustrating a result of multiplexing the channel frequency response and squared magnitude of the error signal together when co-channel interference is not present in a channel.

FIG. 10A is a graph illustrating a squared magnitude of a channel frequency response and a squared magnitude of an error signal when co-channel interference is not present in a channel. FIG. 10B is a graph illustrating a result of multiplexing the channel frequency response and squared magnitude of the error signal together when co-channel interference is not present in a channel.

The co-channel interference detector 820 may detect co-channel interference based on the following theory: if no co-channel interference is present in received signal the square of the magnitude of the channel frequency response $|H|^2$ is always proportional to the SNR, whereas the error signal $Err^2$ is always inversely proportional to the SNR. The error signal $Err^2$ is the same as noise power of a received carrier. When deep nulls are present in a symbol stream that is composed of received carriers (as shown in FIG. 10A for example), and co-channel interference is not present in a corresponding channel, $|H|^2$ compensates for $Err^2$, and $|H|^2*Err^2$ always results in a nearly constant mean value $K_0$, as shown in FIG. 10B, for example. It will be appreciated that $|H|^2*Err^2$ may be slightly smaller than $K_0$ for a carrier with deep nulls. This is because in deep null case calculation of error signal $Err^2$ may be incorrect (i.e. lower than actual error) due to mistakes in demapping process.

Figure 11A:
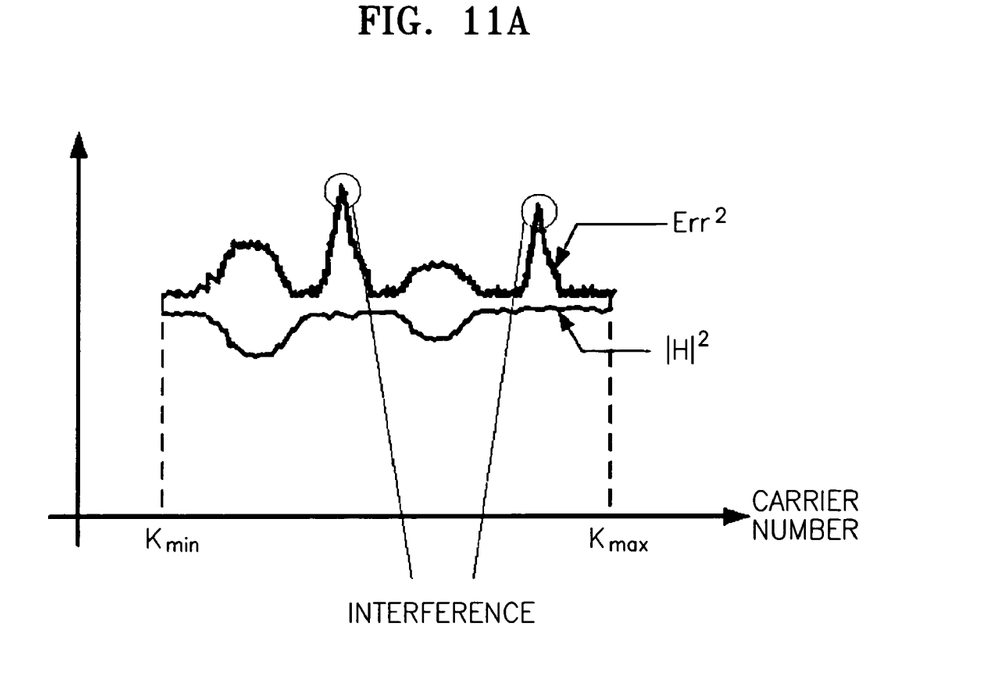
FIG. 11A is a graph illustrating a squared magnitude of a channel frequency response and a squared magnitude of an error signal when co-channel interference is present in a channel.
Figure 11B:
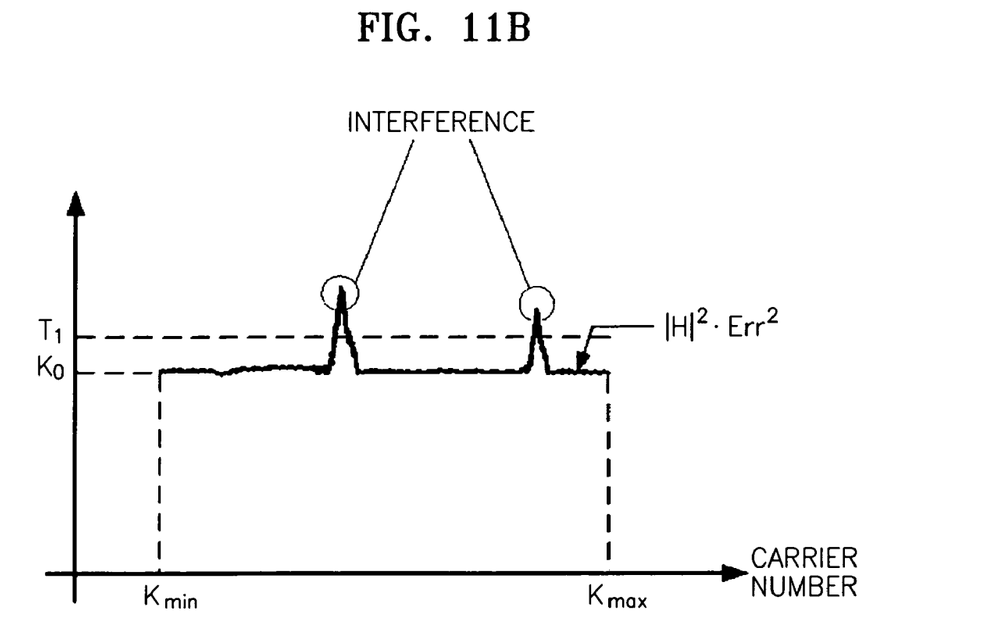
FIG. 11B is a graph illustrating a result of multiplexing the channel frequency response and squared magnitude of the error signal together when co-channel interference is present in a channel.

FIG. 11A is a graph illustrating a squared magnitude of a channel frequency response and a squared magnitude of an error signal when co-channel interference is present in a channel. FIG. 11B is a graph illustrating a result of multiplexing the channel frequency response and squared magnitude of the error signal together when co-channel interference is present in a channel.

In contrast to the no co-channel interference case of FIGS. 10A and 10B, in a channel with co-channel interference, the error signal $Err^2$ corresponding to a carrier that is affected by co-channel interference is so strong (see FIG. 11A) that it is not compensated for by the square of the magnitude of the channel frequency response $|H|^2$. Thus, as shown in FIG. 11B, $|H|^2*Err^2$ for a carrier affected by co-channel interference results in a value that is much higher than the mean value $K_0$. In FIG. 11B, a threshold T1 may be used as a given coefficient (referred to as "first coefficient information T1") for the co-channel interference detector 820 to detect co-channel interference. The co-channel interference detector 820 will be described in more detail later.

Figure 12:
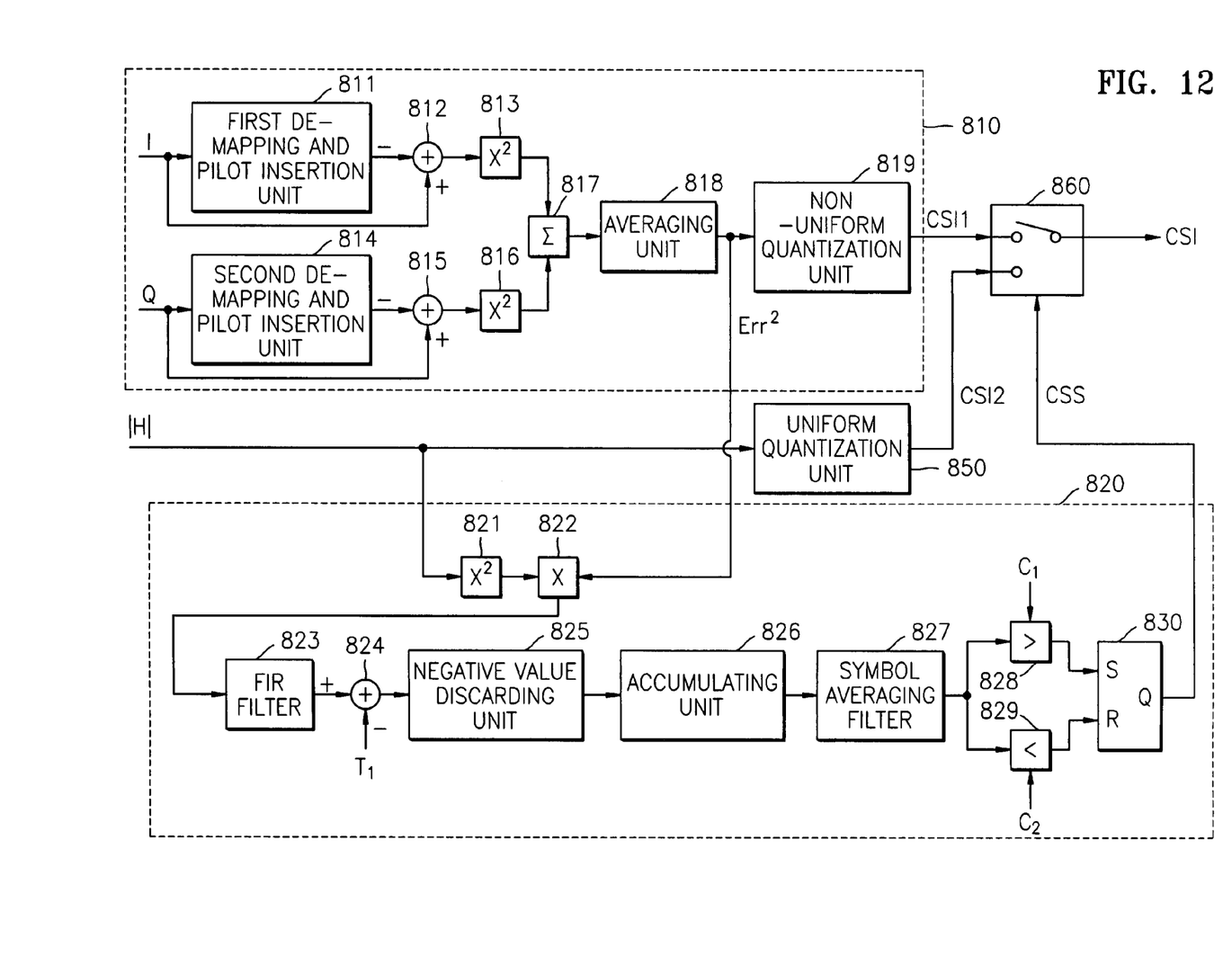
FIG. 12 is a detailed block diagram of the channel state measurement apparatus of FIG. 9.

FIG. 12 is a detailed block diagram of the direct channel state measurement unit 810 of FIG. 9 in accordance with an exemplary embodiment of the present invention. Referring to FIG. 12, a first de-mapping and pilot insertion unit 811 of the direct channel state measurement unit 810 may insert a first given pilot into the complex symbol stream I. The first de-mapping and pilot insertion unit 811 then performs de-mapping on the complex symbol stream I. A first subtraction unit 812 subtracts the de-mapped complex symbol stream I from the complex symbol stream I and outputs a first subtraction result. A first squaring unit 813 squares a signal output from the first subtraction unit 812 and outputs the squared signal.

As shown in FIG. 12, the direct channel state measurement unit 810 may include a second de-mapping and pilot insertion unit 814 for inserting a second given pilot into the complex symbol stream Q, and for de-mapping the complex symbol stream Q. A second subtraction unit 815 subtracts the de-mapped complex symbol stream Q from the complex symbol stream Q and outputs a second subtraction result to a second squaring unit 816. The second squaring unit 816 squares the second subtraction result and outputs a squared signal.

As mentioned above, the complex symbols streams I and Q are composed of in-phase (I) streams and quadrature (Q) streams, and are complex signals equalized by the channel equalizer of FIG. 3. The first or second de-mapping and pilot insertion units 811 or 814 perform de-mapping on these complex signals according to a modulation format such as QAM or binary phase shift keying (BPSK), for example. Within each of the first and second de-mapping and pilot insertion units 811 and 814, pilot insertion may be carried out by a sequence generator that substitutes a given real value for a carrier in a given position, for example.

Referring again to FIG. 12, a summation unit 817 sums signals output from the first squaring unit 813 and the second squaring unit 816. An averaging unit 818 of the direct channel state measurement unit 810 averages a signal output from the summation unit 817 during a current symbol duration, and a signal output from the summation unit 817 during a previous symbol duration, and outputs the error signal $Err^2$.

The direct channel state measurement unit 810 may also include a non-uniform quantization unit 819. The non-uniform quantization unit 819 quantizes the error signal $Err^2$ received from averaging unit 818 to generate the direct channel state information CSI1 by inverting the error signal $Err^2$. This may be done using an inverse, non-uniform transferfunction, for example, so as to output the direct channel state information CSI1.

The inverse, non-uniform transfer function may output a digital value that is quantized into 3 or 4 bits in inverse, non-uniform proportion to the error signal $Err^2$, for example. Such an inverse, non-uniform transfer function may be empirically obtained based on experimental results. For example, the inverse, non-uniform transfer function may be used to quantize the error signal $Err^2$ of about 9 to 11 bits into about 3 to 4 bits having a relatively smaller magnitude, when the magnitude of the error signal $Err^2$ is relatively large, and to quantize the error signal $Err^2$ of about 9 to 11 bits into about 3 to 4 bits having a relatively larger magnitude, when the magnitude of the error signal $Err^2$ is relatively small.

FIG. 12 also illustrates the co-channel interference detector 820 in greater detail. The co-channel interference detector 820 includes a third squaring unit 821 that squares the magnitude of the channel frequency response $|H|$ and outputs the squared value $|H|^2$ to a multiplication unit 822. The multiplication unit 822 multiples the square of the magnitude of the channel frequency response $|H|^2$ and the error signal $Err^2$ together, and outputs the result of the multiplication to a frequency impulse response (FIR) filter 823. The FIR filter 823 integrates given carriers included in the signal $|H|^2*Err^2$ output using non-recursive filtering, and outputs a result of the integration.

Since frequency selective or co-channel interference may influence a plurality of adjacent carriers, the FIR filter 823 integrates the signal $|H|^2*Err^2$ output from the multiplication unit 822 using non-recursive filtering. In other words, the FIR filter 823 integrates the signal $|H|^2*Err^2$ output from the multiplication unit 822 and outputs the result of the integration on a first-come, first-serve basis. In this way, the FIR filter 823 outputs an average value.

The co-channel interference detector 820 includes a third subtraction unit 824 that subtracts the first coefficient information T1 from a signal output from the FIR filter 823. The first coefficient information T1 is large enough to be used to determine the effect of co-channel interference. Referring to FIG. 11B, when a carrier is affected by co-channel interference, a signal ($|H|^2*Err^2$)−T1 output from the third subtraction unit 824 has a strongly positive value. In contrast, when the carrier is not affected by co-channel interference (as in FIGS. 10A and 10B), the signal ($|H|^2*Err^2$)−T1 has a negative value. Thus, when the first coefficient information T1 is large, error in detecting the effect of co-channel interference can be suppressed.

The co-channel interference detector 820 includes a negative value discarding unit 825 that discards the signal ($|H|^2*Err^2$)−T1 when it is negative and outputs the signal ($|H|^2*Err^2$)−T1 to an accumulating unit 826 only when it is positive. The accumulating unit 826 accumulates a signal output from the negative value discarding unit 825 during one symbol duration and outputs the result of the accumulation to a symbol averaging filter 827. The symbol averaging filter 827 averages a signal output from the accumulating unit 826 during a current symbol duration and a signal output from the accumulating unit 826 during a previous symbol duration, and outputs the result of the averaging to a pair of comparators, a first comparator 828 and a second comparator 829.

The first comparator 828 compares a signal output from the symbol averaging filter 827 with second coefficient information C1 and outputs first comparison information having a logic state that changes based on the comparison result. The second comparator 829 compares the signal output from the symbol averaging filter 827 with third coefficient information C2 and outputs second comparison information having a logic state that changes based on the comparison result.

Each of the above comparison results (first comparison information and second comparison information) are input to a logic circuit 830. The logic circuit 830 generates the channel state selection control signal CSS at a given logic state depending on the logic states of the input first comparison information and second comparison information. The CSS is output from logic circuit 830 at a second logic state (e.g., logic high) if the first comparison information is at a second logic state (e.g., logic high). The CSS is output from logic circuit 830 at a first logic state (e.g., logic low) if the second comparison information input thereto is at the second logic state. The state of the CSS signal is maintained (at its previous logic state) if the first comparison information and the second comparison information are both input to the logic unit 830 at the first logic state (e.g., both logic low states).

In other words, when the signal output from the symbol averaging filter 827 is higher than the second coefficient information C1, the logic circuit 830 outputs the CSS at the second logic state. When the signal output from the symbol averaging filter 827 is lower than the third coefficient information C2, the logic circuit 830 outputs the CSS at the first logic state. Also, when the signal output from the symbol averaging filter 827 is higher than the third coefficient information C2 and lower than the second coefficient information C1, the logic circuit 830 outputs the CSS at its previous logic state. It is within the skill of the art that different combinations of signal states could be used to change or maintain the state of the CSS signal between successively periods.

The co-channel interference detector 820 of FIG. 12 may detect narrowband co-channel interference having arbitrary spectral properties. However, as in a co-channel environment where a DVB-T signal is mixed with an analog TV signal, when a position in which co-channel interference occurs is previously known, reliability of detection of co-channel interference can be improved by using the known position of the co-channel interference.

Figure 13:
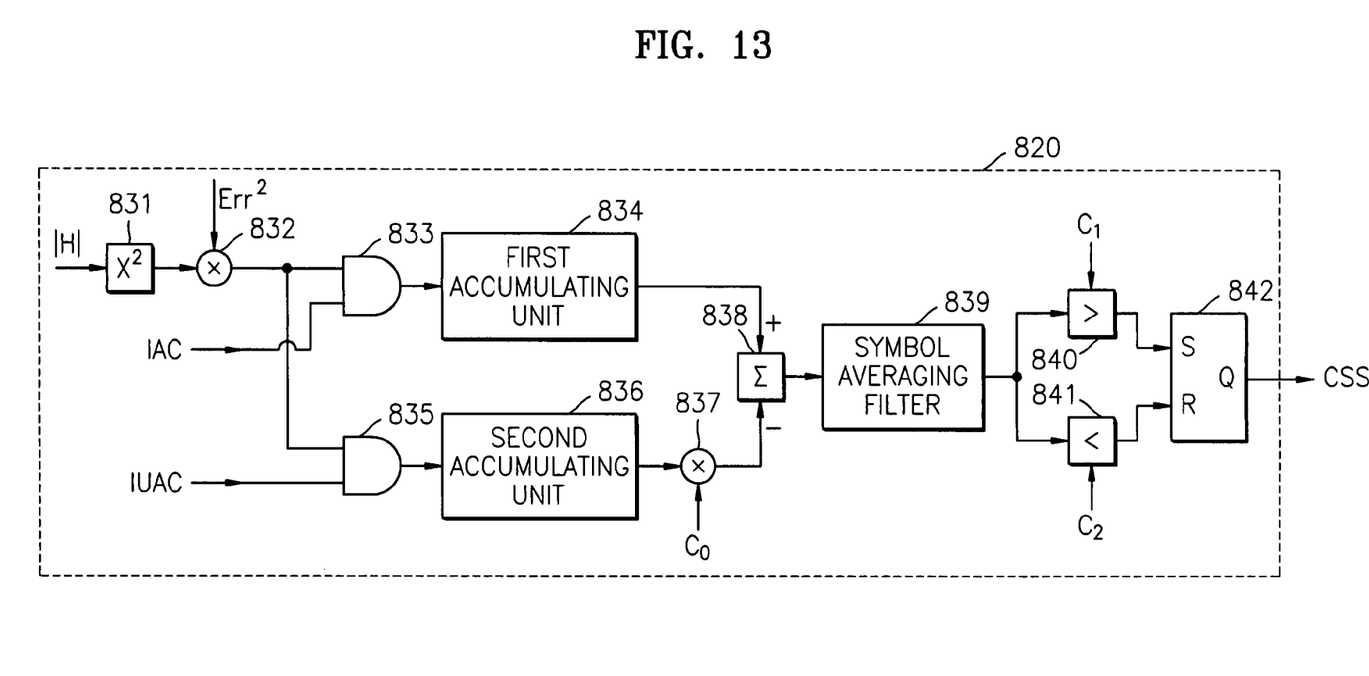
FIG. 13 is a block diagram of a co-channel interference detector of FIG. 9 according to another exemplary embodiment of the present invention.

FIG. 13 illustrates the co-channel interference detector 820 of FIG. 9 according to another embodiment of the present invention. The co-channel interference detector 820 of FIG. 13 may be more efficient, especially when the position of co-channel interference is previously known, as shown in FIG. 7. The spectrum of an analog TV signal in the co-channel environment shows three peaks, i.e., a peak of a vision carrier, a peak of a color sub-carrier, and a peak of a sound sub-carrier. In particular, since the vision carrier is substantially strong, it causes co-channel interference in a carrier of the DVB-T signal of the same frequency. The co-channel interference detector 820 of FIG. 13 may be adapted to effectively solve this problem.

Referring to FIG. 13, the co-channel interference detector 820 includes a third squaring unit 831 and first multiplication unit 832. The operation of these components are not described in detail here for purposes of clarity. The operation of third squaring unit 831 and first multiplication unit 832 is as described in FIG. 12 regarding the third squaring unit 821 and multiplication until 822, to output the signal $|H|^2*Err^2$.

However, the co-channel interference detector 820 includes a first switching circuit 833, second switching circuit 835, first and second accumulating units 834 and 836, a second multiplication unit 837 and a third subtraction unit 838. These components have been substituted for the FIR filter 823, third subtraction unit 824, negative value discarding unit 825 and accumulating unit 826 of FIG. 12.

In response to a logic state of interference affected carrier information (IAC), the first switching circuit 833 only outputs the signal $|H|^2*Err^2$ from the first multiplication unit 832 when the IAC is in the second logic state (logic high). The first accumulating unit 834 accumulates the signal ($|H|^2*Err^2$ from the first switching circuit 833 during one symbol duration, and outputs the result of the accumulation.

In response to a logic state of non-interference affected carrier information (IUAC), the second switching circuit 835 only outputs the signal $|H|^2*Err^2$ from the first multiplication unit 832 when the IUAC is in the second logic state (logic high). The second accumulating unit 836 accumulates the signal $|H|^2*Err^2$ from the second switching circuit 835 during one symbol duration and outputs a result of the accumulation. It should be understood that triggering output based on a second logic state as described above is only exemplary; the signal $|H|^2*Err^2$ could be output to one of the first and second switching circuits 833 and 855 based on another logic state (low) of the IAC/IUAC for example, or different logic states (high/low).

The second multiplication unit 837 multiplies the signal $|H|^2*Err^2$ output from the second accumulating unit 836 and first coefficient information C0 together and outputs the result of the multiplication. The IAC indicates the position of a carrier that causes co-channel interference as the vision carrier shown in FIG. 7. The IAC shifts to the second logic state (high) from the first logic state (low) at a first time interval corresponding to the position of the carrier causing co-channel interference.

Similarly, the IUAC indicates the position of a carrier that does not cause co-channel interference. The IUAC shifts to the second logic state from the first logic state at a second time interval corresponding to the position of the carrier that does not cause co-channel interference. In order to indicate the position of the carrier that causes or does not cause co-channel interference, a counter (not shown) can be used. The counter may be reset at the first and second time intervals.

The third subtraction unit 838 subtracts a signal output from the second multiplication unit 837 from a signal output from the first accumulating unit 834 and outputs the result of the subtraction. The symbol averaging filter 839, first comparator 840, second comparator 841 and logic circuit 842 operate exactly as described in FIG. 12 with respect to the symbol averaging filter 827, first comparator 828, second comparator 829 and logic circuit 830. Thus, a detailed explanation of how the channel state selection signal CSS is generated for output from the logic circuit 842 of FIG. 13 to the selector 860 of FIG. 9 is omitted here for the sake of brevity.

As described above, the apparatus according to the exemplary embodiments of the present invention selects one of the direct channel state information CSI1 output from the direct channel state measurement unit 810 and the indirect channel state information CSI2 output from the uniform quantization unit 850, based on the channel state selection control signal CSS output from the co-channel interference detector 820. Thus, since the channel state measurement apparatus has the advantages of both the direct method of channel state measurement and the indirect method of channel state measurement, the performance of a receiver (such as a DVB-T receiver) employing the apparatus can be improved for addressing channels having frequency selective interference, i.e., co-channel interference.

The method and apparatus for providing channel state information according to the exemplary embodiments of the present invention may provide reasonably acceptable channel measurement performance in a channel with white noise, in a static channel, and in a channel having frequency selective interference (i.e., a channel having co-channel interference as in the case when an analog TV signal is mixed into a DVB-T signal).

The method and apparatus according to the exemplary embodiments of the present invention may thus detect co-channel interference and selectively employ one of a direct and indirect method of channel state measurement, based on the amount of co-channel interference. Therefore, when reliable channel state information output from the apparatus is used for bit metric calculation of a subsequent error correction decoder, such as a Viterbi decoder, SNR gain of a system may be enhanced.

While the present invention has been particularly shown and described with reference to exemplary embodiments thereof, it will be understood by those of ordinary skill in the art that various changes in form and details may be made therein without departing from the spirit and scope of the exemplary embodiments of the present invention as defined by the appended claims and their equivalents.

What is claimed is:

1. A channel state measurement apparatus for a receiver, comprising:
    a direct channel state measurement unit adapted to receive complex symbol streams, adapted to perform de-mapping on the complex symbol streams, adapted to calculate an error signal based on the received complex symbol streams and de-mapped complex symbol streams, and adapted to generate direct channel state information based on the calculated error signal;
    an indirect channel state measurement unit adapted to generate indirect channel state information based on a magnitude of a channel frequency response;
    a co-channel interference detection unit adapted to generate a channel state selection control signal based on the calculated error signal and the magnitude of the channel frequency response; and
    a selection unit adapted to selectively output one of the direct channel state information and the indirect channel state information based on a logic state of the channel state selection control signal;
    wherein the co-channel interference detection unit detects co-channel interference using:
        a value calculated by multiplying a square of the magnitude of the channel frequency response and the error signal; and
        at least one coefficient information; and
    wherein the co-channel interference detection unit generates the channel state selection control signal based on a result of the detection.

2. The apparatus of claim 1, wherein the direct channel state measurement unit comprises:
    a first de-mapping and pilot insertion unit adapted to insert a given pilot into an I stream of the complex symbol streams, adapted to perform de-mapping on the I stream, and adapted to output the de-mapped I stream;
    a first subtraction unit adapted to subtract the de-mapped I stream from the I stream to output a-first subtraction result;
    a first squaring unit adapted to square the first subtraction result to output a first squaring result;
    a second de-mapping and pilot insertion unit adapted to insert the given pilot into a Q stream of the complex symbol streams, adapted to perform de-mapping on the Q stream, and adapted to output the de-mapped Q stream;
    a second subtraction unit adapted to subtract the de-mapped Q stream from the Q stream to output a second subtraction result;
    a second squaring unit adapted to square the second subtraction result to output a second squaring result;
    a summation unit adapted to sum the first squaring result and the second squaring result to output a summed value;
    an averaging unit adapted to average a summed value output from the summation unit during a current symbol duration and a summed value output from the summation unit during a previous symbol duration to output the calculated error signal; and
    a non-uniform quantizing unit adapted to quantize the calculated error signal by inverting the calculated error signal using a non-uniform transfer function to output the direct channel state information.

3. The apparatus of claim 1, wherein the indirect channel state information is a signal obtained by quantizing the magnitude of the channel frequency response with a uniform transfer function.

4. The apparatus of claim 1, wherein the co-channel interference detection unit comprises:
    a third squaring unit adapted to square the magnitude of the channel frequency response to output a third squaring result;
    a multiplication unit adapted to multiply the third squaring result and the error signal to output a multiplication result signal;
    a frequency impulse response (FIR) filter adapted to integrate given carriers included in the multiplication result signal based on non-recursive filtering to provide an integrated signal;

a third subtraction unit adapted to subtract first coefficient information from the integrated signal to output a third subtraction result;

a negative value discarding unit adapted to discard a negative-valued third subtraction result and adapted to output a positive-valued third subtraction result as an output signal;

an accumulating unit adapted to accumulate the output signal during one symbol duration to output an accumulation result;

a symbol averaging filter adapted to average the accumulation result output from the accumulating unit during a current symbol duration with the accumulation result output during a previous symbol duration to output an averaged signal;

a first comparator adapted to compare the averaged signal with second coefficient information to output first comparison information;

a second comparator adapted to compare the averaged signal with third coefficient information to output second comparison information; and a logic circuit adapted to output the channel state selection control signal based on a logic state of one of the first comparison information and the second comparison information.

5. The apparatus of claim 4, wherein the logic circuit outputs the channel state selection control signal:
  at a second logic state, if the first comparison information is at the second logic state, or
  at a first logic state, if the second comparison information is at the second logic state, or
  at its previous logic state, if one of the first comparison information and the second comparison information is at the first logic state.

6. The apparatus of claim 1, wherein the co-channel interference detection unit comprises:
  a third squaring unit adapted to square the magnitude of the channel frequency response to output a third squaring result;
  a first multiplication unit adapted to multiply the third squaring result and the error signal to output a first multiplication result;
  a first switching circuit adapted to enable output of the first multiplication result based on a logic state of interference-affected carrier information;
  a first accumulating unit adapted to accumulate the first multiplication result, if received from the first switching unit, during one symbol duration to output a first accumulation result;
  a second switching circuit adapted to enable output of the first multiplication result based on a logic state of non-interference-affected carrier information;
  a second accumulating unit adapted to accumulate the first multiplication result, if received from the second switching unit, during one symbol duration to output a second accumulation result;
  a second multiplication unit adapted to multiply the second accumulation result and first coefficient information to output a second multiplication result;
  a third subtraction unit adapted to subtract the second multiplication result from the first accumulated result to output a third subtraction result;
  a symbol averaging filter adapted to average a third subtraction result output from the third subtraction unit during a current symbol duration with a third subtraction result output during a previous symbol duration to output an averaged signal;

a first comparator adapted to compare the averaged signal with second coefficient information to output first comparison information;

a second comparator adapted to compare the averaged signal with third coefficient information to output second comparison information; and a logic circuit adapted to output the channel state selection control signal based on a logic state of one of the first comparison information and the second comparison information.

7. The apparatus of claim 6, wherein the logic circuit outputs the channel state selection control signal:
  at a second logic state, if the first comparison information is at the second logic state, or
  at a first logic state, if the second comparison information is at the second logic state, or
  at its previous logic state, if one of the first comparison information and the second comparison information is at the first logic state.

8. The apparatus of claim 6, wherein the first switching circuit only outputs the first multiplication result to the first accumulating unit if the logic state of the interference-affected carrier information is in a second logic state, and
  wherein the second switching circuit only outputs the first multiplication result to the second accumulating unit if the logic state of the non-interference-affected carrier information is in the second logic state.

9. The apparatus of claim 1, wherein the receiver is a digital video broadcasting-terrestrial (DVB-T) receiver.

10. A method of providing channel state information in a receiver, comprising:
  (a) generating direct channel state information based on a calculated error signal;
  (b) generating indirect channel state information based on a magnitude of a channel frequency response;
  (c) detecting co-channel interference adapted to generate a channel state selection control signal based on the calculated error signal and the magnitude of the channel frequency response; and
  (d) selectively outputting one of the direct channel state information and the indirect channel state information based on a logic state of the channel state selection control signal;
  wherein the co-channel interference is detected using:
    a value calculated by multiplying a square of the magnitude of the channel frequency response and the error signal; and
    at least one coefficient information; and
  wherein the channel state selection control signal is generated based on a result of the detection.

11. The method of claim 10, wherein step (a) comprises:
  (a1) inserting a given pilot into an I stream of a plurality of received complex symbol streams;
  (a2) de-mapping the I stream to output a de-mapped I stream;
  (a3) subtracting the de-mapped I stream from the I stream to output a first subtraction result;
  (a4) squaring the first subtraction result to output a first squaring result;
  (a5) inserting the given pilot into a Q stream of the received complex symbol streams;
  (a6) de-mapping the Q stream to output a de-mapped Q stream;
  (a7) subtracting the de-mapped Q stream from the Q stream to output a second subtraction result;
  (a8) squaring the second subtraction result to output a second squaring result;

(a9) summing the first squaring result and the second squaring result to output a sum;

(a10) averaging the sum output during a current symbol duration and the sum output during a previous symbol duration to generate a calculated error signal; and (a11) quantizing the calculated error signal by inverting the calculated error signal using a non-uniform transfer function to generate the direct channel state information.

12. The method of claim 10, wherein the indirect channel state information is a signal obtained by quantizing the magnitude of the channel frequency response with a uniform transfer function.

13. The method of claim 10, wherein step (c) comprises:

(c1) squaring the magnitude of the channel frequency response to output a third squaring result;

(c2) multiplying the third squaring result and the calculated error signal to output a multiplication result;

(c3) integrating given carriers included in the multiplication result using non-recursive filtering to output an integration result;

(c4) subtracting first coefficient information from the integration result to output a third subtraction result;

(c5) discarding a negative-valued third subtraction result, else outputting a positive-valued third subtraction result as an output signal;

(c6) accumulating the output signal during one symbol duration to generate an accumulation result;

(c7) averaging the accumulation result for a current symbol duration and the accumulation result during a previous symbol duration to output an averaged signal;

(c8) comparing the averaged signal with second coefficient information to generate first comparison information;

(c9) comparing the averaged signal with third coefficient information to generate second comparison information; and (c10) generating the channel state selection control signal based on a logic state of one of the first comparison information and the second comparison information.

14. The method of claim 13, wherein step (c10) includes:

(c101) generating the channel state selection control signal at a second logic state, if the first comparison information is at the second logic state, or (c102) generating the channel state selection control signal at a first logic state, if the second comparison information is at the second logic state, or (c103) generating the channel state selection control signal at its previous logic state, if one of the first comparison information and the second comparison information is at the first logic state.

15. The method of claim 10, wherein step (c) comprises:

(c1) squaring the magnitude of the channel frequency response to output a third squaring result;

(c2) multiplying the third squaring result and the calculated error signal to output a first multiplication result;

(c3) outputting the first multiplication result, if interference-affected carrier information is in a given logic state;

(c4) accumulating the first multiplication result corresponding to the interference-affected carrier information during one symbol duration to output a first accumulation result;

(c5) outputting the first multiplication result, if non-interference-affected carrier information is in the given logic state;

(c6) accumulating the first multiplication result corresponding to the non-interference-affected carrier information during one symbol duration to output a second accumulation result;

(c7) multiplying the second accumulation result and first coefficient information to output a second multiplication result;

(c8) subtracting the second multiplication result from the first accumulation result to output a third subtraction result;

(c9) averaging the third subtraction result for a current symbol duration and the third subtraction result for a previous symbol duration to output an averaged signal;

(c10) comparing the averaged signal with second coefficient information to generate first comparison information;

(c11) comparing the averaged signal with third coefficient information to generate second comparison information; and (c12) generating the channel state selection control signal based on a logic state of one of the first comparison information and the second comparison information.

16. The method of claim 15, wherein step (c12) includes:

(c121) generating the channel state selection control signal at a second logic state, if the first comparison information is at the second logic state, or (c122) generating the channel state selection control signal at a first logic state, if the second comparison information is at the second logic state, or (c123) generating the channel state selection control signal at its previous logic state, if one of the first comparison information and the second comparison information is at the first logic state.

17. In a channel state measurement apparatus of a receiver, a co-channel interference detector adapted to provide a selection control signal to selectively output one of direct channel state information determined from a calculated error signal and indirect channel state information determined from a channel frequency response, comprising:

a multiplier adapted to multiply a squared value of a magnitude of the channel frequency response and the calculated error signal to output a multiplication result;

a filter adapted to integrate the multiplication result to output an integration result;

a subtractor adapted to subtract given coefficient information from the integration result to output a subtraction result;

a discarding unit adapted to discard a negative-valued subtraction result and adapted to output a positive-valued subtraction result as an output signal;

an accumulator adapted to accumulate the output signal during one symbol duration to generate an accumulation result;

an averager adapted to average the accumulation result for a current duration and an accumulation result during a previous duration to output an averaged signal to be used for generating first and second comparison information; and a logic unit adapted to generate the selection control signal based on a logic state of one of the first comparison information and the second comparison information.

18. The detector of claim 17, wherein the logic unit generates the selection control signal:

at a high logic state, if the first comparison information is at the high logic state, or at a low logic state, if the second comparison information is at the high logic state, or at its previous logic state, if one of the first comparison information and the second comparison information is at the low logic state.

19. In a channel state measurement apparatus of a receiver, a co-channel interference detector adapted to provide a selection control signal to selectively output one of direct channel state information determined from a calculated error signal and indirect channel state information determined from a channel frequency response, comprising:
- a first multiplier adapted to multiply a square value of a magnitude of the channel frequency response with the calculated error signal to output a first multiplication result;
- a first switching circuit adapted to output the first multiplication result if interference-affected carrier information is in a given logic state;
- a first accumulator adapted to accumulate the first multiplication result during one symbol duration to output a first accumulation result;
- a second switching circuit adapted to output the first multiplication result if non-interference-affected carrier information is in the given logic state;
- a second accumulator adapted to accumulate the first multiplication result during one symbol duration to output a second accumulation result;
- a second multiplier adapted to multiply the second accumulation result and a coefficient to output a second multiplication result;
- a subtractor adapted to subtract the second multiplication result from the first accumulation result to output a subtraction result;
- an averager adapted to average the subtraction result for a current duration and a subtraction result during a previous duration to output an averaged signal to be used for generating first and second comparison information; and
- a logic unit adapted to generate the selection control signal based on a logic state of one of the first comparison information and the second comparison information.

20. The detector of claim 19, wherein the logic unit generates the selection control signal:
- at a high logic state, if the first comparison information is at the high logic state, or
- at a low logic state, if the second comparison information is at the high logic state, or
- at its previous logic state, if one of the first comparison information and the second comparison information is at the low logic state.

21. A channel state measurement apparatus for a receiver that provides channel state information in accordance with the method of claim 10.

22. An apparatus for providing channel state information in a receiver in accordance with the method of claim 10.

* * * * *